12) United States Patent
Marchand et al.

(10) Patent No.: US 8,683,370 B2
(45) Date of Patent: Mar. 25, 2014

(54) SYSTEMS AND METHODS FOR GENERATING DATA VISUALIZATION DASHBOARDS

(75) Inventors: Troy A. Marchand, Nobleton (CA); Terrence Eugene Sheflin, Brampton (CA); Ravindar A. Bhavnani, Toronto (CA); Adrian Serban Dobrin, Toronto (CA); Robert E. Siklos, Toronto (CA)

(73) Assignee: Dundas Data Visualization, Inc., Toronto, Ontario (CA)

( * ) Notice: Subject to any disclaimer, the term of this patent is extended or adjusted under 35 U.S.C. 154(b) by 319 days.

(21) Appl. No.: 12/897,550

(22) Filed: Oct. 4, 2010

(65) Prior Publication Data

US 2011/0246925 A1 Oct. 6, 2011

Related U.S. Application Data

(60) Provisional application No. 61/309,238, filed on Mar. 1, 2010.

(51) Int. Cl.
*G06F 3/048* (2013.01)

(52) U.S. Cl.
USPC .............. 715/772; 707/802; 715/771; 705/35

(58) Field of Classification Search
None
See application file for complete search history.

(56) References Cited

U.S. PATENT DOCUMENTS

| | | | |
|---|---|---|---|
| 6,289,462 B1 | 9/2001 | McNabb et al. | |
| 7,565,683 B1 | 7/2009 | Huang et al. | |
| 7,669,244 B2 | 2/2010 | Smith | |
| 7,822,662 B2 * | 10/2010 | Guzik et al. | 705/35 |
| 7,900,139 B2 | 3/2011 | Hosotsubo | |
| 8,261,181 B2 | 9/2012 | Tien et al. | |
| 2003/0236732 A1 | 12/2003 | Cimral et al. | |
| 2005/0027871 A1 | 2/2005 | Bradley et al. | |
| 2005/0050315 A1 | 3/2005 | Burkhardt et al. | |
| 2005/0216831 A1 | 9/2005 | Guzik et al. | |
| 2006/0212791 A1 | 9/2006 | Crow et al. | |
| 2006/0259629 A1 | 11/2006 | Usmani et al. | |

(Continued)

OTHER PUBLICATIONS

Prosecution Documents relating to U.S. Appl. No. 12/552,595/Publication No. 2010/0058466 (1st Office Action, Response, Final Office Action dated Oct. 26, 2011).

(Continued)

*Primary Examiner* — Boris Pesin
*Assistant Examiner* — Ayesha Huertas Torres
(74) *Attorney, Agent, or Firm* — Bereskin & Parr LLP/S.E.N.C.R.L., s.r.l.

(57) ABSTRACT

An aspect of the technology described relates to a dashboard creation system for generating dashboards displaying key performance indicator information. The dashboard creation system includes: a business database comprising a plurality of business values; an intermediate table comprising intermediate data; and at least one key performance indicator record. In some implementations, the intermediate data includes: an intermediate value corresponding to a selected plurality of the business values; and an intermediate link identifying the corresponding selected plurality of business values. Also, the key performance indicator record may include: a key performance indicator value corresponding to the intermediate value; a key performance indicator link corresponding to the intermediate link and identifying the corresponding selected plurality of the business values; and a key performance indicator format corresponding to a desired graphical format for depicting the key performance indicator value. The intermediate value may be a summary value corresponding to an analysis of the selected plurality of business values. In such case, the intermediate link may comprise a summary link identifying analytical procedures for producing the summary value.

17 Claims, 10 Drawing Sheets

(56) References Cited

U.S. PATENT DOCUMENTS

| | | | |
|---|---|---|---|
| 2007/0180519 A1 | 8/2007 | Boccon-Gibod et al. |
| 2007/0234198 A1 | 10/2007 | Tien et al. |
| 2008/0010233 A1 | 1/2008 | Sack et al. |
| 2008/0059441 A1 | 3/2008 | Gaug et al. |
| 2008/0115103 A1 | 5/2008 | Datars et al. |
| 2008/0127052 A1 | 5/2008 | Rostoker |
| 2008/0229213 A1 | 9/2008 | Hamilton et al. |
| 2008/0256439 A1 | 10/2008 | Boreham et al. |
| 2008/0256440 A1 | 10/2008 | Boreham et al. |
| 2009/0055724 A1 | 2/2009 | Van ham et al. |
| 2009/0187845 A1 | 7/2009 | Middelfart |
| 2009/0217150 A1 | 8/2009 | Lin |
| 2010/0058466 A1 | 3/2010 | Marchand et al. |
| 2010/0100562 A1 | 4/2010 | Millsap |
| 2010/0161677 A1* | 6/2010 | Zurek et al. | 707/802 |
| 2010/0251129 A1 | 9/2010 | Beringer et al. |
| 2010/0318200 A1 | 12/2010 | Foslien et al. |
| 2011/0061013 A1* | 3/2011 | Bilicki et al. | 715/771 |
| 2011/0145880 A1 | 6/2011 | Wang |
| 2011/0210986 A1 | 9/2011 | Goutsev et al. |
| 2011/0214081 A1 | 9/2011 | Dobrin et al. |
| 2011/0296311 A1 | 12/2011 | Dias et al. |
| 2011/0302194 A1 | 12/2011 | Gonzalez et al. |
| 2011/0314403 A1 | 12/2011 | Yan |
| 2012/0089902 A1 | 4/2012 | Sheflin |
| 2012/0166963 A1 | 6/2012 | Kohli et al. |
| 2012/0179513 A1 | 7/2012 | Siklos et al. |
| 2012/0180002 A1 | 7/2012 | Campbell et al. |
| 2012/0180108 A1 | 7/2012 | Siklos et al. |
| 2012/0254053 A1 | 10/2012 | Joa et al. |
| 2013/0042190 A1 | 2/2013 | Ciloci |

OTHER PUBLICATIONS

Prosecution Documents relating to U.S. Appl. No. 13/036,443/Publication No. 2011/0214081 (1st Office Action, Response, 2nd Non Final Office Action and Response dated Oct. 31, 2013).

Prosecution Documents relating to U.S. Appl. No. 12/897,450/Publication No. 2011/0210986 (1st Office Action and Response dated Oct. 8, 2013).

Prosecution Documents relating to U.S. Appl. No. 13/267,955/Publication No. 2012/0089902 (1st Office Action, Response and Final Office Action dated Oct. 2, 2013).

Prosecution Documents relating to U.S. Appl. No. 13/082,512/Publication No. 2012/0179513 (1st Office Action, Response and Final Office Action dated Oct. 10, 2013).

Prosecution Documents relating to U.S. Appl. No. 13/082,556/Publication No. 2012/0180108 (1st Office Action, Response, Final Office Action and Appeal Brief dated Sep. 20, 2013).

Prosecution Documents relating to U.S. Appl. No. 13/368,441/Publication No. 2013/0042190 (Election Restriction Office Action, Response and Non-Final Office Action dated Oct. 3, 2013).

Michael Calore "How Do Native Apps and We Apps Compare?" Aug. 19, 2010, available at http:/ /web.archive.org/web/2000819203811/ http://www.webmonkey.com/2010/08/how-do-native-apps-and-web-appscompare/.

Document relating to U.S. Appl. No. 13/082,556, dated Jan. 17, 2014 (Office Action).

* cited by examiner

133'

| Orders | | | |
|---|---|---|---|
| Order ID (302) | Order Amt (304) | Region ID (306) | Cust ID (308) |
| ... | ... | ... | ... |
| 10003 | 285.00 | R1 | 801 |
| 10004 | 622.50 | R2 | 950 |
| 10005 | 382.50 | R3 | 302 |
| 10006 | 827.50 | R4 | 209 |
| 10007 | 505.00 | R1 | 785 |
| 10008 | 355.00 | R2 | 422 |
| 10009 | 792.50 | R3 | 125 |
| 10010 | 657.50 | R4 | 290 |
| 10011 | 452.50 | R2 | 600 |
| 10012 | 775.00 | R3 | 503 |
| 10013 | 297.50 | R4 | 326 |
| 10014 | 507.50 | R3 | 662 |
| 10015 | 800.00 | R4 | 235 |
| 10016 | 302.50 | R4 | 128 |
| ... | ... | ... | ... |

| Regions | |
|---|---|
| Region ID (306') | Name (324) |
| R1 | Northeast |
| R2 | Southeast |
| R3 | Southwest |
| R4 | Northwest |

| Intermediate Link | | |
|---|---|---|
| Identifier (530) | Data Connector (532) | Accessor (534) |
| Region Sales | SalesDC | SELECT Orders.[Region ID] AS [Region ID], Regions.[Name] AS [Region Name], SUM(Orders.[Order Amt]) AS [Total Sales], COUNT(*) AS [Number of Orders] FROM Regions INNER JOIN Orders ON Regions.[Region ID] = Orders.[Region ID] GROUP BY Orders.[Region ID], Regions.[Name] |

| Intermediate Values | | | |
|---|---|---|---|
| Region ID (506) | Region Name (524) | Total Sales (504) | Number of Orders (502) |
| R1 | Northeast | 790.00 | 2 |
| R2 | Southeast | 1430.00 | 3 |
| R3 | Southwest | 2457.50 | 4 |
| R4 | Northwest | 2885.00 | 5 |

| | | KPI Record | | |
|---|---|---|---|---|
| Identifier (602) | Intermediate Table (653) | Metric (655) | Dimension (606) | Format (608) |
| Sales by Region | Region Sales | Total Sales | Region Name | Bar Chart |

| | |
|---|---|
| KPI Preview (624 / 655') | |
| Region Name | Total Sales |
| Northeast | 790.00 |
| Northwest | 2885.00 |
| Southeast | 1430.00 |
| Southwest | 2457.50 |

640a → Northeast row; 640 → other rows

| | | |
|---|---|---|
| | Intermediate Link | |
| Identifier (1030) | Data Connector (1032) | Accessor (1034) |
| Region Sales Details | SalesDC | SELECT Orders.[Order ID] AS [Order ID], Orders.[Order Amt] AS [Order Amt], Regions.[Region ID] AS [Region ID], Regions.[Cust ID] AS [Cust ID], Regions.[Name] AS [Region Name] FROM Regions INNER JOIN Orders ON Regions.[Region ID] = Orders.[Region ID] |

| Order ID (1002) | Order Amt (1004) | Region ID (1006) | Cust ID (1008) | Region Name (1024) |
|---|---|---|---|---|
| ... | ... | ... | ... | ... |
| 10003 | 285.00 | R1 | 801 | Northeast |
| 10004 | 622.50 | R2 | 950 | Southeast |
| 10005 | 382.50 | R3 | 302 | Southwest |
| 10006 | 827.50 | R4 | 209 | Northwest |
| 10007 | 505.00 | R1 | 785 | Northeast |
| 10008 | 355.00 | R2 | 422 | Southeast |
| 10009 | 792.50 | R3 | 125 | Southwest |
| 10010 | 657.50 | R4 | 290 | Northwest |
| 10011 | 452.50 | R2 | 600 | Southeast |
| 10012 | 775.00 | R3 | 503 | Southwest |
| 10013 | 297.50 | R4 | 326 | Northwest |
| 10014 | 507.50 | R3 | 662 | Southwest |
| 10015 | 800.00 | R4 | 235 | Northwest |
| 10016 | 302.50 | R4 | 128 | Northwest |
| ... | ... | ... | ... | ... |

(Intermediate Values header spans the table; 1040 points to rows 10013–10015)

FIG. 10B

SYSTEMS AND METHODS FOR GENERATING DATA VISUALIZATION DASHBOARDS

PRIORITY

This application claims priority from U.S. provisional patent application No. 61/309,238, filed Mar. 1, 2010, which is incorporated by referenced herein in its entirety.

TECHNICAL FIELD

The described embodiments relate generally to methods and systems for dashboard creation.

BACKGROUND

"Dashboards" present visualizations, for example, in graph or chart form, of business values or key performance indicator (KPI) metrics from data stored in business databases. Such visualizations could be viewed in related business applications by executives to obtain an overview of how the business is performing. Dashboards can be implemented in many different types of applications.

The creation of a dashboard can be a complicated process. The data stored in business databases may include large amounts of detailed transactional data stored in complex formats. To generate intermediate data from the business database for a dashboard, the creator of a dashboard may require expertise in database administration to execute queries on the database.

Also, the creator of a dashboard may require knowledge of the business requirements of an organization so as to be able to select the appropriate data from the business database and organize them into KPIs. To perform such tasks, the creator of a dashboard may need to also have training in business analysis.

Further, a dashboard may need to be aesthetically and functionally laid out for it to be useful by a business executive. To accomplish this, the creator of a dashboard may further require expertise in graphic design when determining the desired graphical formats for depicting the KPIs corresponding to intermediate values in the intermediate data.

The applicants have recognized a need for improved systems and methods for creating dashboards.

BRIEF DESCRIPTION OF THE DRAWINGS

Embodiments are described in further detail below, by way of example only, with reference to the accompanying drawings, in which:

FIG. 3A is a schematic illustration showing the records of an example Orders table as may be stored in a business database;

FIG. 3B is a schematic illustration showing records from an example Regions table as may be stored in the business database;

FIG. 5A is a schematic illustration showing an example intermediate link for an intermediate table, in which the intermediate link includes a summary link;

FIG. 5B is a schematic illustration showing example intermediate values of an intermediate table, in which the intermediate values include summary values;

FIG. 6A is a schematic illustration showing an example key performance indicator (KPI) record illustrating a 'Sales by Region' KPI;

FIG. 6B is a schematic illustration showing example preview data records generated from the example KPI record of FIG. 6A;

FIG. 10A is another example schematic illustration showing an intermediate link for an intermediate table; and FIG. 10B is another schematic illustration showing example values of an intermediate table.

DETAILED DESCRIPTION

Figure 1:
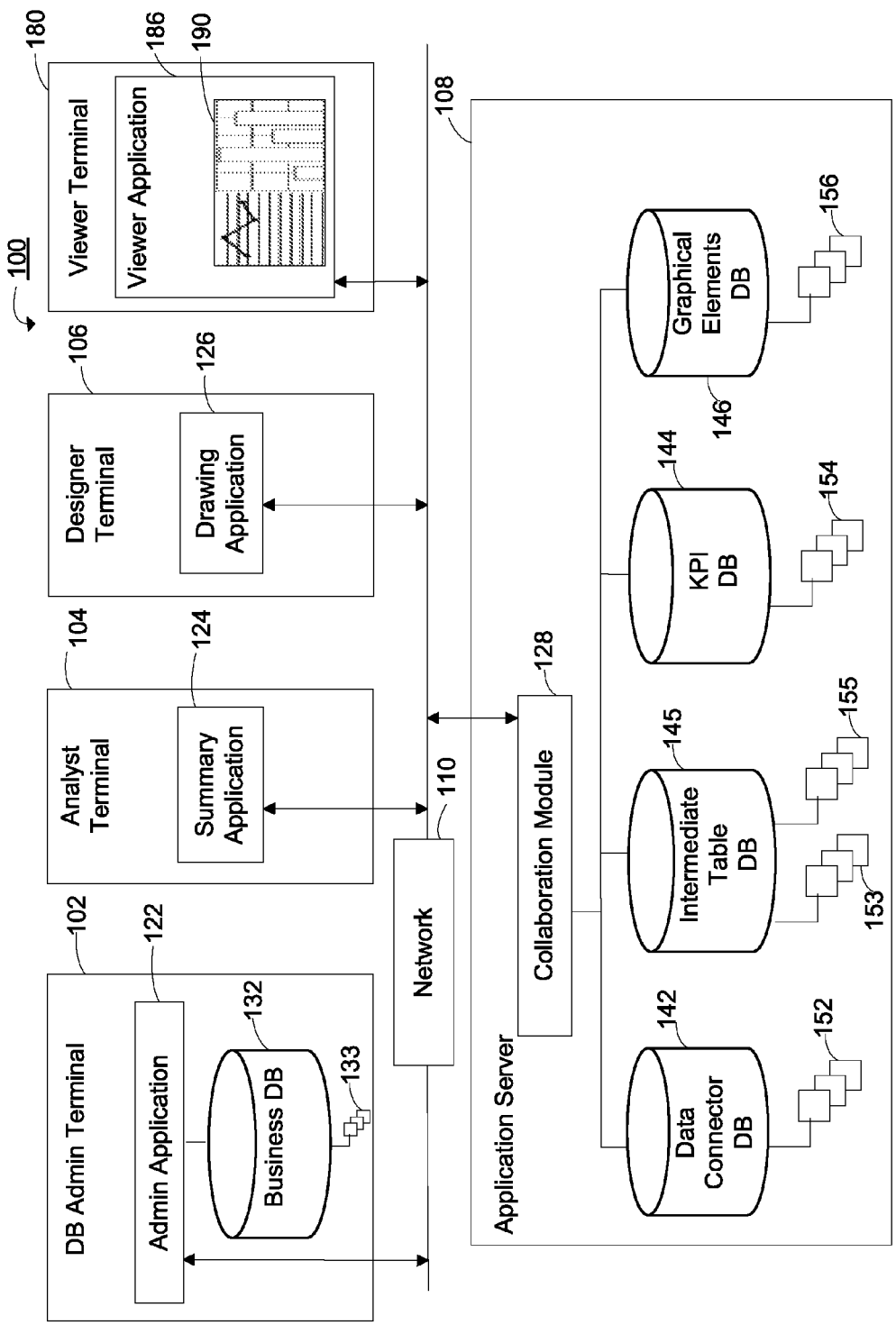
FIG. 1 is a block diagram of one possible configuration of a deployed dashboard creation and management system implementation.

The embodiments described herein relate generally to a dashboard creation and management system that may facilitate the participation of both technical and non-technical users when collaborating on a dashboard development effort.

Collaboration is achieved via the use of a multi-stage workflow, which has clearly defined steps and different types of target users at each step. In general, more technically knowledgeable users (such as those skilled in information technology (IT) and/or database administration) are involved at the beginning of the workflow, and less technically sophisticated users may be involved towards the end of the workflow. By using a staged approach, changes can be made in the creation of a dashboard project at a later step in the development workflow without the need to re-involve a business organization's technical personnel.

Since the group of non-technical users may include end-users (e.g., business executives) that are primarily interested in viewing and interacting with completed dashboards, the potential number of non-technical users (e.g., business executives, business analysts, and/or graphic designers) of the system is in general much larger than the number of technical users (e.g., software developers, database administrators, etc.) of the system. Effectively, the system may permit a much larger set of users to participate directly in the dashboard creation process.

One aspect of the technology described below relates to a dashboard creation system for generating dashboards displaying key performance indicator information. The dashboard creation system includes: a business database comprising a plurality of business values; an intermediate table comprising intermediate data; and at least one key performance indicator record.

In some implementations, the intermediate data includes: an intermediate value corresponding to a selected plurality of the business values; and an intermediate link identifying the corresponding selected plurality of business values. Also, the key performance indicator record may include: a key performance indicator value corresponding to the intermediate value; a key performance indicator link corresponding to the intermediate link and identifying the corresponding selected plurality of the business values; and a key performance indicator format corresponding to a desired graphical format for depicting the key performance indicator value.

The intermediate value may be a summary value corresponding to an analysis of the selected plurality of business values. In such case, the intermediate link may comprise a summary link identifying at least one analytical procedure for producing the summary value.

In some embodiments, the intermediate value may be determined using a database query. This database query may be a SQL query.

One aspect of the technology described below relates to a dashboard creation system for generating dashboards displaying key performance indicator information. The dashboard creation system includes: a business database comprising a plurality of business values; an intermediate table comprising summary data; and at least one key performance indicator record.

In some implementations, the summary data includes: a summary value corresponding to a plurality of the business values; and a summary link identifying the corresponding plurality of business values. Also, the key performance indicator record may include: a key performance indicator value corresponding to the summary value; a key performance indicator link corresponding to the summary link and identifying the corresponding plurality of the business values; and a key performance indicator format corresponding to a desired graphical format for depicting the key performance indicator value.

The dashboard creation system may, in some cases, be configured to render the key performance indicator value in the key performance format. Additionally or alternatively, the dashboard creation system may be configured to communicate the key performance indicator value and the key performance format to a drawing application configured to render the key performance indicator value in the key performance format.

In some implementations, the dashboard creation system may be implemented as part of a drawing application.

In further embodiments, the dashboard creation system may include intermediate data that comprises a plurality of intermediate values and a corresponding intermediate link for each intermediate value. In other embodiments, the key performance indicator record may include a plurality of key performance indicator values and a corresponding key performance indicator link for each key performance indicator value.

Another aspect of the technology described below relates to a method for generating dashboards displaying key performance indicator information, the method comprising: providing business data corresponding to a plurality of business values; creating an intermediate table comprising intermediate data; and creating a key performance indicator record.

In some embodiments, the intermediate data may include: an intermediate value corresponding to a selected plurality of the business values; and an intermediate link identifying the corresponding selected plurality of business values. In some embodiments, the intermediate value may be determined using a database query that is a SQL query.

The intermediate value may be a summary value corresponding to an analysis of the selected plurality of business values. In such case, the intermediate link may comprise a summary link identifying analytical procedures for producing the summary value.

A further aspect of the technology described below relates to a method for generating dashboards displaying key performance indicator information, the method comprising: providing business data corresponding to a plurality of business values; creating an intermediate table comprising summary data; and creating a key performance indicator record.

In some embodiments, the summary data may include: a summary value corresponding to a plurality of the business values; and a summary link identifying the corresponding plurality of business values.

The key performance indicator record may include: a key performance indicator value corresponding to the intermediate value; a key performance indicator link corresponding to the intermediate link; and a key performance indicator format corresponding to a desired graphical format for depicting the key performance indicator value.

In some embodiments, the method may include rendering the key performance indicator value in the key performance format, and/or communicating the key performance indicator value and the key performance format to a drawing application configured to render the at least one key performance indicator value in the key performance format.

Additionally or alternatively, the method may include revising the key performance indicator record such that the intermediate data includes a second intermediate value corresponding to a second selected plurality of the business values and a second intermediate link identifying the corresponding second selected plurality of business values.

In the context of the revised key performance indicator record, the method may further include: determining a new key performance indicator value corresponding to the second intermediate value; determining a new key performance indicator link corresponding to the second intermediate link; determining a new key performance format corresponding to a desired graphical format for depicting the new key performance indicator value; and storing the new key performance indicator value, the new key performance indicator link and the new key performance format in the key performance indicator record.

In some embodiments, the method includes rendering the new key performance indicator value in the new key performance format, and/or communicating the new key performance indicator value and the new key performance format to a drawing application configured to render the new key performance indicator value in the new key performance format.

Figure 7:
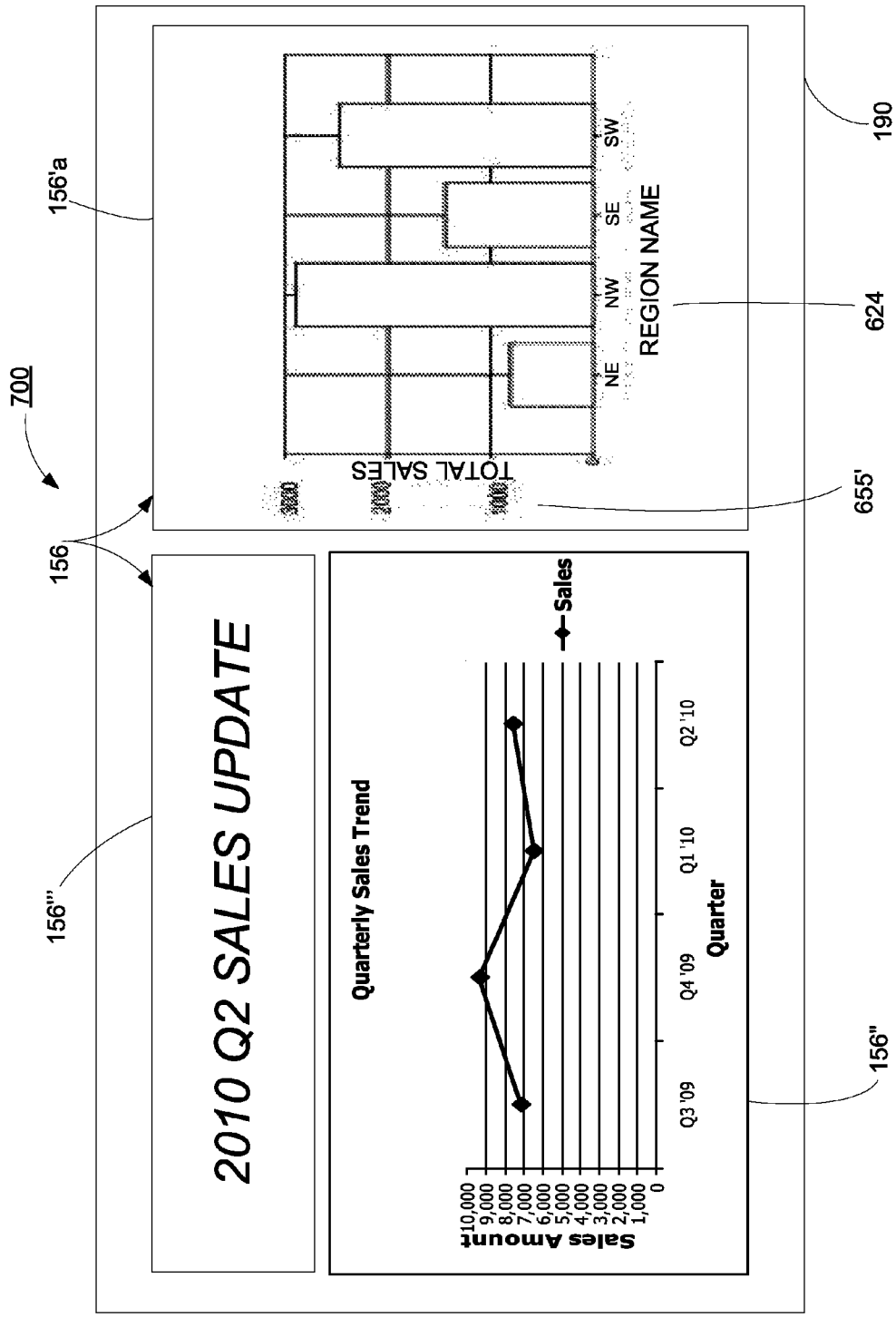
FIG. 7 is an example screenshot of a rendered dashboard, containing a graphical depiction of the KPI record of FIG. 6A.

Referring to FIG. 1, a block diagram of a dashboard creation system for generating dashboards to display key performance indicator information, is shown generally as 100. The implementation includes a database administration terminal 102, an analyst terminal 104, a designer terminal 106 and an application server 108. Each of these components may be operatively connected to a network 110 to facilitate communications with each other. When a dashboard 190 is generated, it may be viewed on viewer terminal 180. Referring momentarily to FIG. 7, a completed dashboard 190 design, shown generally as 700, is illustrated with graphical elements 156'a, 156" showing various key performance indicators in various graphical formats. Illustrated also is a graphical element 156''' not directly associated with a KPI (e.g., a text box).

From a high level perspective, the dashboard 190 creation process involves application server 108 providing remote software functionality to database administration terminal 102, analyst terminal 104 and designer terminal 106. Each terminal 102, 104, 106 is targeted at a different role in the dashboard 190 creation process, such that users with differing areas of expertise may collectively create a dashboard 190.

Database administration terminal 102 and administration application 122 may be used to interact with business database 132 by system administrators, database administrators or database experts. In some cases, software developers may also use database administration terminal 102 if there is a need to integrate dashboards into other applications or web portals. For the purpose of simplicity, the users of database administration terminal 102 will be referred to below as "database administrators". Database administration terminal 102 can be configured to generate an intermediate table 145 (for simplicity, the terms "intermediate table database" and "intermediate table" will be used interchangeably below), which includes intermediate data 153, 155 from the business database 132. The intermediate table 145 acts as a conduit for providing intermediate information to summary application 124 on analyst terminal 104. This conduit allows business analysts to just refer to the intermediate table 145 instead of requiring the technical expertise to access business database 132.

Analyst terminal 104 and summary application 124 may typically be used by business analysts, business managers and/or executives. These users will be referred to below generally as "business analysts". Business analysts may define KPIs from the intermediate data 153, 155 in the intermediate table 145 to derive key performance indicator records 154. Because KPI records 154 are defined by business analysts using analyst terminal 104, graphic designers can reference these records 154 when designing a dashboard 190. That is, they may not need to have knowledge of business requirements for defining useful KPIs.

Designer terminal 106 and drawing application 126 may typically be used by graphic designers familiar with visual design. For simplicity, these users may generally be referred to below as "graphic designers". The key performance indicator records 154 may be accessible by the designer terminal 106 when designing the visual layout of the dashboard 190.

When each of these terminals 102, 104, 106 operate, the generated intermediate table 145 and KPI records 154 may be stored in, and accessed from, databases 145, 144 on application server 108.

Database administration terminal 102, analyst terminal 104, designer terminal 106 and application server 108 comprise a number of components, including microprocessors. Microprocessors typically control the overall operation of computer systems. Microprocessors interact with additional subcomponents such as memory storage (which may include random access memory (RAM) and read-only memory (ROM), and persistent storage such as flash memory), display, network adapter and input device(s), for example, such as a keyboard, mouse, touchscreen (which may form part of the display) or touchpad. Network adapters allow connection to different types of networks (for example, Local Area Networks (LANs) as well as Wide Area Networks (WANs)). Operating system software used by a microprocessor is typically stored in a persistent store such as flash memory or read-only memory (ROM) or similar storage. Those skilled in the art will appreciate that the operating system, specific software components, or parts thereof, may be temporarily loaded into a volatile store such as RAM. Microprocessors, in addition to operating system functions, enable execution of software components. In the exemplary embodiment in FIG. 1, database administration terminal 102 executes administration application 122, analyst terminal 104 executes summary application 124, designer terminal 106 executes drawing application 126, application server 108 executes collaboration module 128 and viewer terminal 180 executes viewer application 186.

Since the database administration terminal 102, the analyst terminal 104, the designer terminal 106 and viewer terminal 180 may access remote software programs available on application server 108, these terminals 102, 104, 106, 180 may collectively be referred to as client terminals in a client-server system architecture known in the art. Correspondingly, each of administration application 122, summary application 124, drawing application 126 and viewer application 186 may be configured to connect to and send and receive messages from application server 108 on network 110. In an alternate embodiment, the functionality of each of the client applications 122, 124, 126, 186 may also be divided such that they each include a client application programming interface (API) for managing the functionality associated with connecting to network 110 and accessing functions on application server 108.

As alluded to above, in the dashboard creation system 100 of the current disclosure, the workflow for creating a dashboard 190 may be divided into three steps that employ each of the database administration terminal 102, analyst terminal 104 and designer terminal 106 respectively. It will be understood that while FIG. 1 illustrates each of these steps as being performed by separate applications executing on separate terminals, the illustrated applications may be provided in a single application accessible on one or more terminals. This may be in the form of a standalone executable or a web application accessible through a web browser, using methods known in the art. It will further be understood that the functionality provided by viewer application 186 on viewer terminal 180 need not be performed by a separate viewer application 186 on a separate viewer terminal 180, and may also be incorporated into one or more applications. Other system configurations and methodologies may be employed as will be understood.

The database administration terminal 102 includes an administration application 122 and a business database 132. The business database 132 contains the business data values 133 that are to be analyzed and visualized in the dashboard 190. For example, the business database 132 may be an accounting and inventory management control database that stores transactional data for sales over time in a number of geographical locations. Referring briefly to FIGS. 3A and 3B, example tables named Orders 133' and Regions 133" are illustrated that may be stored in such a database 132: the Orders table 133' storing a number of sales orders for an organization, and the Regions table 133" identifying the regions that the sales geography is divided into.

In some embodiments, the business database 132 may be stored on a server computer (not shown) separate from the database administration terminal 102. In such embodiment, such other computer may be operatively connected to the network 110 so that the administration application 122 may access the business database 132. In other embodiments, the business database 132 may be stored on the application server 108. In further embodiments, the administration application 122 may have no direct connection with the database 132; instead, the collaboration module 128 may be connected to the database 132 (either locally on application server 108 or remotely on a separate server computer), and the administration application 122 may connect to the database 132 through collaboration module 128.

The administration application 122 may be used to prepare the data sources that will supply the business values 133. This may include setting up connections (i.e., a data connector record 152 stored in data connector database 142) to physical business databases 132, or defining database query statements for selecting the intermediate data 153, 155 that is relevant for the dashboard 190 (discussed below). Administration application 122 may also include the functionality to produce an intermediate table 145 comprising the intermediate data 153, 155 that is referenced by summary application 124 on analyst terminal 104. As will be described in greater detail below, the intermediate data 153, 155 includes an intermediate link 153 and intermediate values 155 that correspond to the selected business values 133 in business database 132. In one embodiment, the intermediate data 153, 155 may include the execution of an SQL statement on the business database 132 to select intermediate values 155. In other embodiments, the intermediate values 155 may include summary values that correspond to an analysis of the selected plurality of business values 133 in business database 132. In such case, the intermediate link 153 may include a summary link identifying analytical procedures for producing the summary value. The analytical procedures may, for example, use SQL functions (e.g., summation, average, count, maximum, minimum, etc.) to perform calculations on the business values 133. In other embodiments not using a summary link to identify analytical procedures, SQL functions may still be used, to sort, restrict, or aggregate the business data values 133 without performing any analysis.

It will be understood that in some embodiments, intermediate values 155 may not be stored in intermediate database 145. Instead, intermediate values 155 may be dynamically derived, generated or retrieved from the business database 132 using the intermediate link 153 (e.g., a SQL query) when required. That is, a SQL query may only be executed to retrieve the intermediate values 155 when requested, without the results of the query being stored in intermediate database 145. In other embodiments, intermediate values may be cached in intermediate database 145 and be periodically updated.

Analyst terminal 104 includes summary application 124, which provides the functionality of defining key performance indicators (KPIs). KPIs can be metrics for measuring different aspects of business performance, and are typically based on the intermediate data 153, 155 in intermediate table 145. That is, the key performance values may be a subset of the intermediate values 155. For example, if the intermediate values 155 included aggregated total sales figures per calendar quarter for several years, a KPI may specify that the key performance indicator values corresponding to the intermediate values 155 should only be for the current year. Also, a KPI can have a key performance indicator format, which indicates a visual format in which the KPI values can be depicted. Referring briefly to FIG. 7, shown there is an example graphical element 156" depicting a line chart for total sales for four consecutive quarters from Q3 '09 to Q2 '10.

Figure 8A:
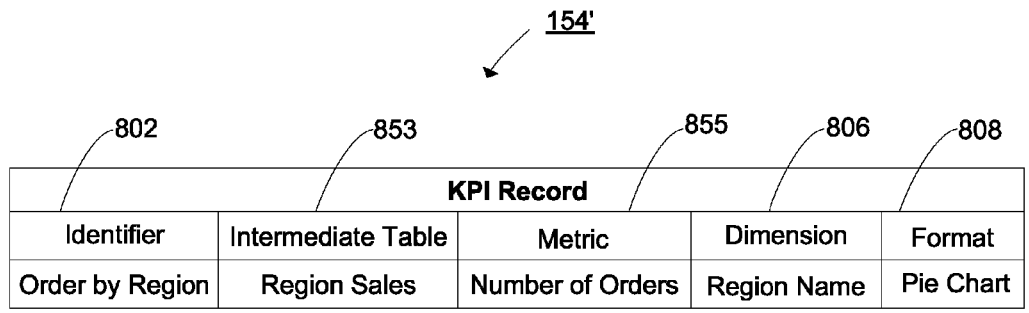
FIG. 8A is a schematic illustration showing an example KPI record, revised from the KPI record of FIG. 6A to illustrate an 'Orders by Region' KPI.
Figure 8B:
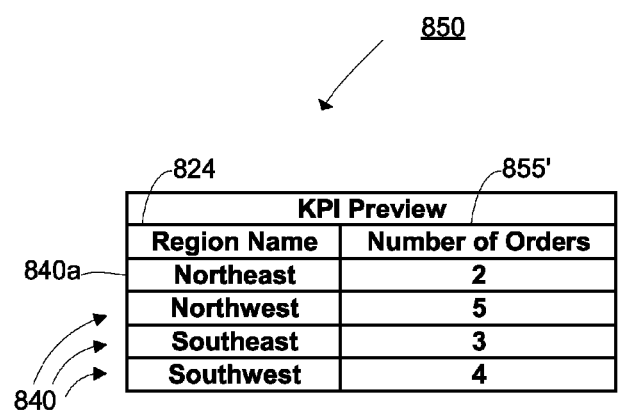
FIG. 8B is a schematic illustration showing example preview data records generated from the revised example KPI record of FIG. 8A.

In another example, a KPI may also be a comparison of overall sales from the current quarter to the same quarter in the previous year. Other examples of KPIs include total sales amount for different regions within a geographical sales location (see briefly, e.g., the data for such a KPI is shown in FIG. 6B), or the number of orders per region (see e.g., the data for such a KPI is shown in FIG. 8B).

The definition of KPIs may require expertise and knowledge in the area of business analysis. Since KPIs can be based on the intermediate data 153, 155 in intermediate table 145, the business analysts using summary application 124 can define KPIs without performing the tasks associated with connecting to or querying business database 132 typically performed by database administrators.

KPIs may be stored in KPI database 144 as a KPI record 154. This KPI record 154 may be accessed by drawing application 126 in designer terminal 106. A KPI record 154 may also specify the way in which the referenced intermediate data 153, 155 in the intermediate table 145 may be visualized. Referring briefly to FIG. 6A (and as described in greater detail below), there is shown an example KPI record 154 indicating a 'Sales by Region' KPI that is based on the intermediate table 'Region Sales', uses 'Total Sales' as the metric and is to be visualized as a 'Bar Chart'. Referring briefly also to FIG. 8A, there is shown another example KPI record 154' indicating an 'Orders by Region' KPI that is also based on the intermediate table 'Region Sales'. This KPI uses 'Number of Orders' as the metric and is preferably visualized as a 'Pie Chart'.

Designer terminal 106 may include drawing application 126, which allows a graphic designer to visually design the dashboard 190 by placing the graphical elements 156 corresponding to KPIs on the dashboard 190 and selecting desired graphical formats for the KPIs. Drawing application 126 may include tools to lay out the graphical elements 156 in a desired fashion, facilitating resizing and/or moving them in a manner desired by the graphic designer. The selection and placement of the graphical elements 156 on the dashboard 190 may be performed independent of the nature of the metric the KPI corresponds to. For example, the location and size of the visual representation of the KPI may be modified regardless of the key performance indicator values in the KPI or the key performance indicator format (e.g., line graph, bar chart, etc.) that has been selected for the KPI. The dashboard can also contain graphical elements that are not related to KPIs, or to business data in any way. These elements are typically purely visual in nature and are used for improving the look of the dashboard. Examples include static text labels, shapes, and images.

Figure 9:
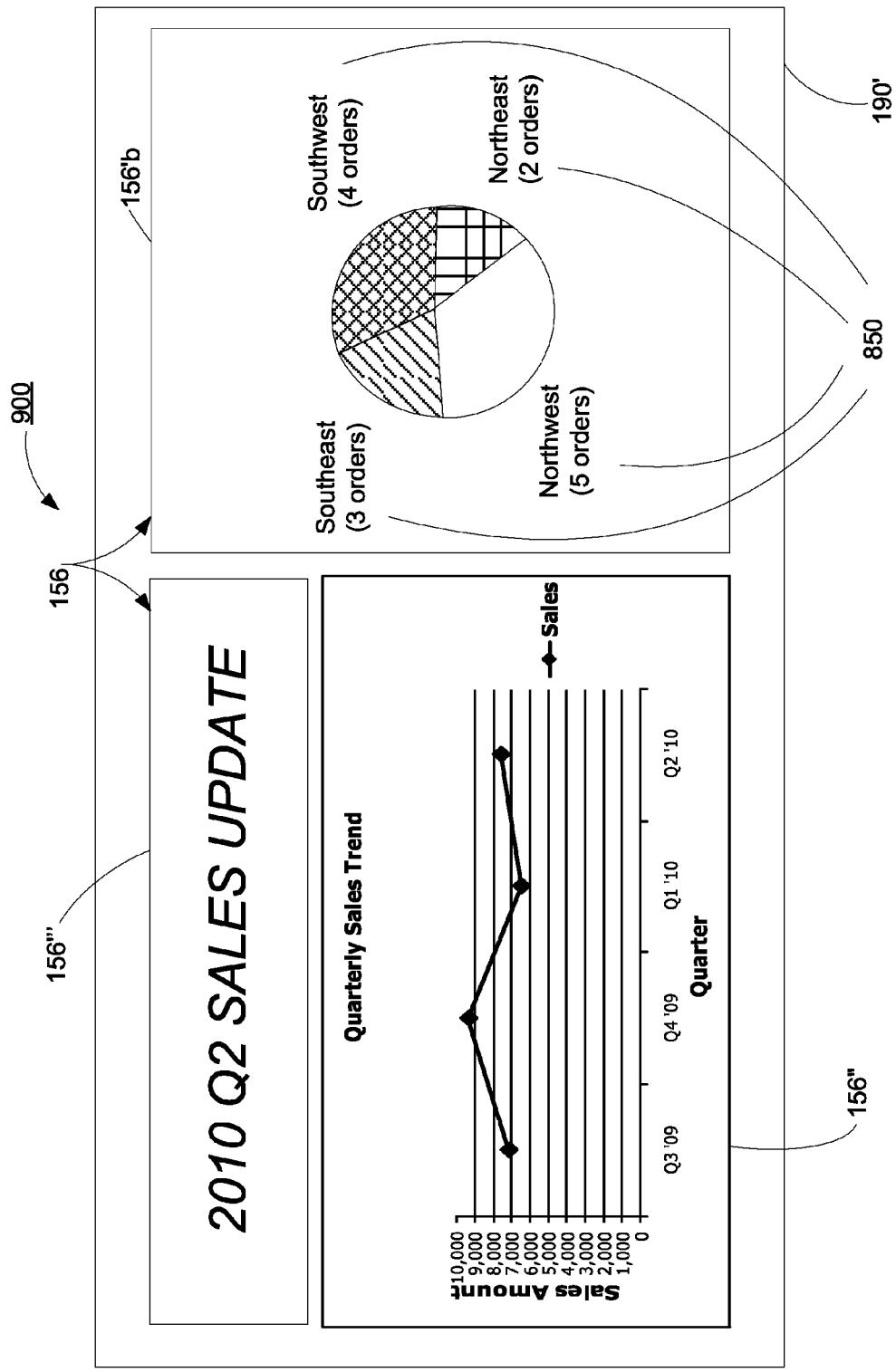
FIG. 9 is another example screenshot of a rendered dashboard, containing a graphical depiction of the revised KPI record of FIG. 8A.

In some embodiments, the drawing application 126 may include the functionality of a viewer application 186 on viewer terminal 180. In such case, the dashboard creation system 100 may be configured to communicate a key performance indicator value and a key performance format to the drawing application 126 to render the key performance indicator value in the key performance format. Referring briefly to FIGS. 7 and 9, illustrated are screenshots of dashboards 190, 190' containing the graphical elements 156'a, 156'b for the 'Sales by Region' and 'Orders by Region' KPIs shown in FIGS. 6B and 8B respectively.

Designer terminal 106 and drawing application 126 may typically be used by individuals with knowledge of graphic design. Since the layout and appearance of graphical elements 156 are based on a KPI record 154, the designers using the drawing application 126 may need little to no knowledge of how to define KPIs. That is, graphic designers may not need to have the business analysis skills necessary to evaluate business requirements for selecting relevant KPIs. Further, the graphic designer may not need to have knowledge of how to access business data values 133 from business database 132 (i.e., graphic designers do not need to have the technical expertise involved in connecting to and/or querying a business database 132). In this way, individuals without the business knowledge required for the tasks of KPI definition or the technical expertise necessary for database 132 access (but with knowledge of graphical design) may collaborate in the creation of a dashboard 190.

Application server 108 may include a collaboration module 128. The collaboration module 128 may typically be a server-side component that facilitates the interaction and data flow amongst the client terminals 102, 104, 106, 180 in the creation of dashboard 190. The collaboration module 128 may be operatively connected to data connector database 142, KPI database 144, intermediate table database 145, and graphical elements database 146. Collaboration module 128 may be configured to send and receive messages on network 110 so as to provide remote access to software programs to the client terminals 102, 104, 106, 180 discussed above. As noted above, in some embodiments, the collaboration module 128 may also be connected to business database 132. In such case, the administration application 122 may perform its operations through the collaboration module 128.

When interacting with database administration terminal 102 to connect to and query business database 132, collaboration module 128 can store a data connector record 152 in data connector database 142. Such data connector record 152 may store the information required to access the business database 132, and may be produced by a database administrator using administration application 122 on database administration terminal 102. The data connector record 152 may contain the security credentials for accessing the business database 132, and once created, the data connector record 152 may be accessed by the collaboration module 128 when a business analyst uses an intermediate table 145. To retrieve the intermediate values 155 referenced in the intermediate link 153 (e.g., to obtain results from executing an SQL statement), the intermediate table 145 may use the information contained in the data connector record 152 to connect to business database 132 before retrieving the business values 133.

Figure 4:
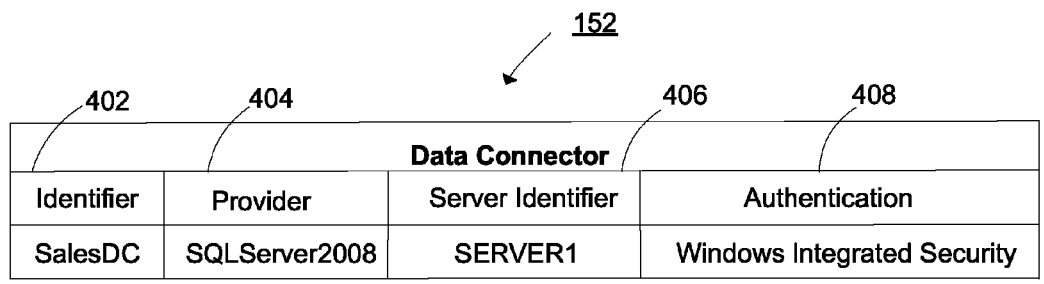
FIG. 4 is a schematic illustration of an example data connector record.

Referring briefly to FIG. 4, shown there is an example data connector record 152, illustrating the data connector for connecting to a business database 132 with the provider 'SQLServer2008' and using 'Windows Integrated Security' for authentication. As is described in greater detail below, this data connector database 142 may be used to retrieve the business values 133 in business database 132 when using or defining an intermediate table 145.

Also, when interacting with database administration terminal 102, collaboration module 128 may be operable to store an intermediate link 153 in the intermediate table database 145. The intermediate link 153 may indicate the data connector record 152 which the intermediate table 145 is to use when selecting its data, the name of the intermediate table 145 and the tables in the business database 132 from which to form the intermediate table 145. Referring briefly to FIG. 5A, illustrated there is an example of an intermediate link 153 illustrating the creation of an intermediate table with the identifier 'Region Sales', which is formed from the tables present in business database 132. The intermediate link 153 also indicates how the intermediate table 145 is formed from the tables in the business database 132. In the example record illustrated in FIG. 5A, the intermediate table 145 with identifier 'Region Sales' is formed by executing a SQL statement to select a plurality of business values 133. The SQL statement performs an inner join on the selected "Orders" and "Regions" tables in the business database 132 (as is shown in the accessor field 534). Further, the intermediate link 153 shown in FIG. 5A can be a summary link because in addition to performing a join on the tables, it subsequently performs the SUM and COUNT analytical operations so as to produce summary values corresponding to an analysis of the selected business values.

When interacting with summary application 124 on analyst terminal 104, the collaboration module 128 may store the generated KPI records 154 in KPI database 144. As indicated and referring briefly to FIG. 6A, the KPI records 154 may store details regarding the nature of the KPI such as the intermediate table 145 on which the KPI is based (e.g., the Intermediate Table field 653 in FIG. 6A), and/or the preferred data visualization or formatting of the KPI when displayed (e.g., the KPI format field 608 in FIG. 6A).

When interacting with drawing application 126 on designer terminal 106, collaboration module 128 may store graphical elements records 156 in graphical elements database 146. Graphical elements records 156 represent a desired graphical format for depicting the KPI value referenced in the KPI record 154 such as a pie chart, or a bar graph, for example. Graphical elements records 156 may also store information relating to the visual appearance of the graphical element. For example, this may include information relating to the positioning and/or size of the graphical element 156. For the sake of simplicity, the terms "graphical element records" and "graphical elements" will be used interchangeably in the discussion below. However, it will be understood that "graphical element records" represent the stored data describing a visually depicted "graphical element" on a display.

After a dashboard 190 design is complete, the collaboration module 128 may be operable to display the dashboard 190 (i.e., a collection of graphical elements) in the viewer application 186 on viewer terminal 180. In doing so, the collaboration module 128 may be configured to communicate a key performance indicator value (e.g., field 655 in FIG. 6A) and a key performance indicator format (e.g., field 608 in FIG. 6A) to the viewer application 186 to render the key performance indicator value 655 in the key performance indicator format 608.

As noted, from a high-level perspective, the dashboard 190 creation process may be seen as involving three parts or stages, each using one of the earlier described client computers 102, 104, 106. For the purposes of illustration in the description below (and in reference to the various figures), an example implementation for a construction company performing its work across various regions of a city will be discussed.

Figure 2:
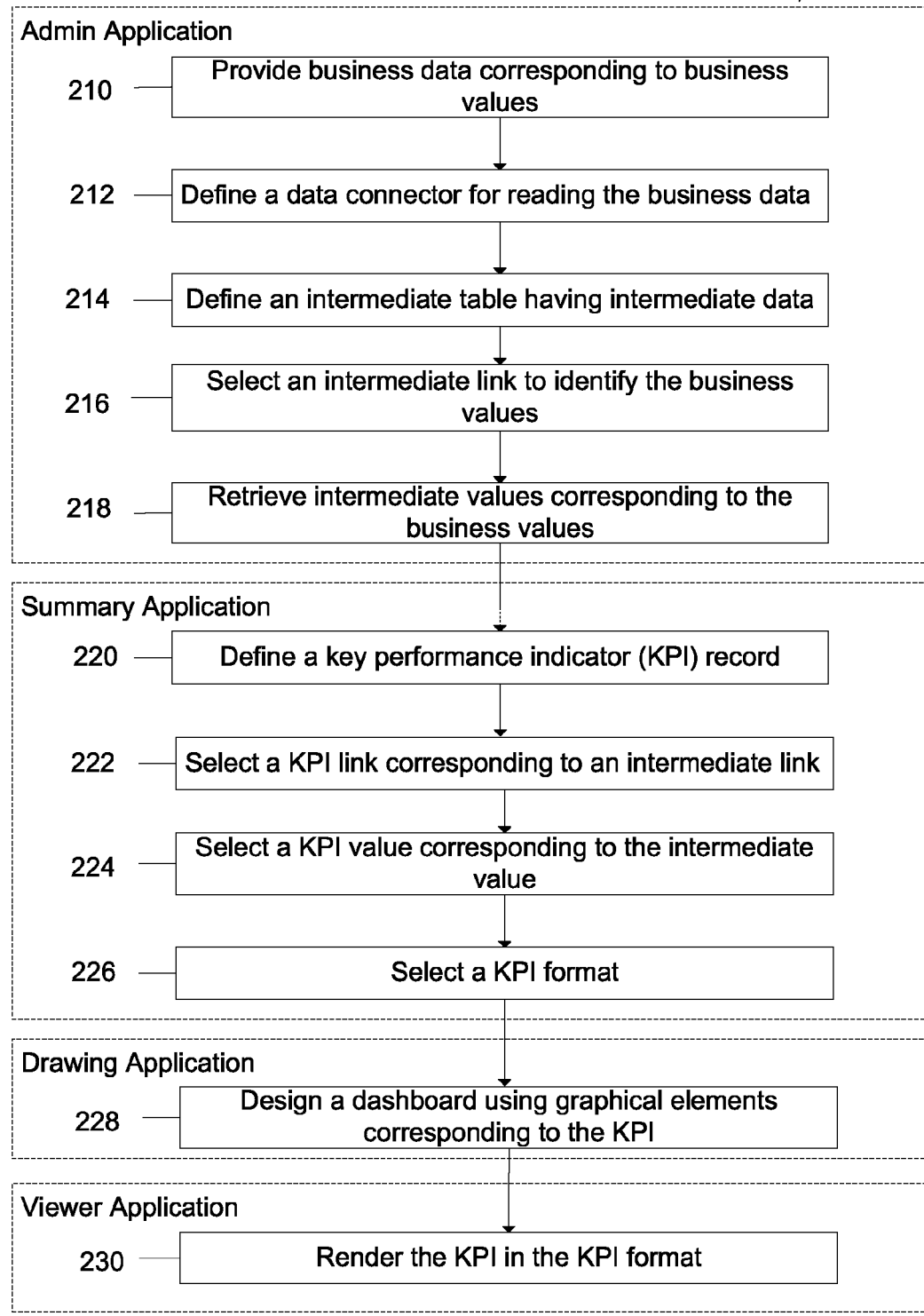
FIG. 2 is a flowchart illustrating a sequence of events for creating a data visualization dashboard, in accordance with one implementation.

Referring to FIG. 2, there is a flowchart illustrating the steps of a method for creating an executive dashboard 190, shown generally as 200. The various actions taken by the applications 122, 124, 126, 186 are indicated within dotted outlines for each respective application 122, 124, 126, 186. That is, blocks 210-218 may be performed by database administrators using administration application 122 on database administration terminal 102; blocks 220-226 may be performed by business analysts using summary application 124 on analyst terminal 104; block 228 may be performed by graphic designers using drawing application 126 on design terminal 106; and block 230 may be performed by business executives using viewer application 186 on viewer terminal 180. It will be understood that the illustration of blocks 210-230 inside the dotted outlines of an application 122, 124, 126, 186 are shown for example purposes only. Such blocks are not required to be executed in the indicated applications 122, 124, 126, 186, and in some embodiments, any one or more of the applications 122, 124, 126, 186 may be configured to perform any one or more of the indicated blocks.

As a starting point, a business database 132 having business values 133 storing the transactional data the construction company has stored and accumulated is provided (Block 210).

Illustrated in FIGS. 3A and 3B are schematic diagrams of examples of this data, shown generally as 133' and 133" respectively. Referring specifically to FIG. 3A, a subset of order records 310 from an 'Orders' table is shown, indicating a number of orders received by the construction company. Each order record 310 may include four fields: an Order Identifier 302, an Order Amount 304, a Region Identifier 306 and a Customer Identifier 308. The Order Identifier 302 is a unique identifier for each order record 310 in the Orders table 133'. The Order Amount 304 reflects the amount that was paid for the order. The customer identifier 308 is an index into a customer table (not shown) storing records relating to and/or identifying the construction company's customers. The Region Identifier 306 provides a link to the corresponding region identifier 306' in the Regions table 133". Examining the order records 310*a* and 310*a'* for orders that were made in the region with Region Identifier 306 'R1', it can be seen that there are two such orders: orders with Order Identifiers 302 '10003' and '10007', for Order amounts 304 '285.00' and '505.00' respectively.

Referring to FIG. 3B, the Regions table, shown generally as 133", illustrates the region records 340 indicating the regions in which the city is divided into. The table may include two fields, a Region Identifier 306' and a name 324. In the example, there are four regions: a Northeast region with Region Identifier 306''R1', a Southeast region with Region Identifier 306''R2', a Southwest region with Region Identifier 306''R3' and a Northwest region with Region Identifier 306''R4'. Carrying on from the example in FIG. 3A, it can be seen that the orders made in the region with Region Identifier 306 'R1' were made in the Northeast region.

Preparing Business Data for KPI Definition

Once a business database 132 has been provided, a database administrator familiar with business database 132 may access database administration terminal 102 to define a data connector (Block 212). As indicated above, using administration application 122, the database administrator may be able to provide the information necessary to populate a data connector record 152 containing this information. Once created, the data connector record 152 may be stored in the data connector database 142 by collaboration module 128. Referring to FIG. 4, illustrated there is an example data connector record 152 for business database 132, shown generally as 152. A data connector record 152 may include a data connector Identifier field 402, a Provider field 404, a Server Identifier field 406, and an Authentication field 408. The data connector Identifier field 402 indicates an identifier of the data connector 152, 'SalesDC', which is provided to allow other tables or programming modules to reference the data connector record 152.

The Provider field 404 indicates the type of database provider (e.g., Oracle™, IBM DB2™, MySQL™, etc.) the data connector record 152 provides a connection to. In this case, the business database 132 is a 'SQLServer2008' database. As is known in the art, the provider of a database is provided in the data connector record 152 because different providers may connect and interact with external programmatic modules in different ways.

The Server Identifier field 406 stores the name, location and/or path of a server on which the business database 132 is running. As noted above, although the business database 132 is illustrated as residing on database administration terminal 102, the business database 132 may reside on other computers operatively connected to the network 110 in FIG. 1. To identify such computer, the Server Identifier field 406 stores the name or path of a computer server on which the business database 132 resides. In the example, business database 132 resides on database administration terminal 102, and Server Identifier field 406 stores an alias to this computer as 'SERVER1'. In some embodiments, there may be multiple business databases 132 that the intermediate table 145 summarizes data from. In such case, there may need to be additional data connector records 152.

The Authentication field 408 stores the method of authentication used by the business database 132 for procuring access to the business database 132. In the example, the authentication field 408 stores 'Windows Integrated Security' as the authentication method—a mechanism that allows the credentials for authentication to be reused from the username and password associated with a user profile of the Windows operating system. In other embodiments, data connector record 152 may include fields such as a username and password to allow business database 132 to authenticate the programmatic module trying to access it.

Once a data connector record 152 has been created, a user of the database administration terminal 102 may define an intermediate table 145 having intermediate data 153, 155 (Block 214). The intermediate data 153, 155 may include one or more intermediate values 155, each corresponding to a plurality of business values 133 stored in business database 132, and an intermediate link 153 corresponding to the business data values 133. An intermediate values 155 may be the result of aggregate operations (which may, for example, be performed by an SQL query) on the business values 133 present in the business database 132. For example, this may be a grouping of records into categories so as to enable easier viewing and understanding of the business data values 133. Or, it may just be a joining of records stored in disparate tables in the business database 132 (as is discussed below in relation to FIGS. 10A and 10B).

An intermediate link 153 in the intermediate data 153, 155 allows the records present in the intermediate table 145 to be identified with the original business data values 133 from which the intermediate data 153, 155 was taken. For example, this may include a SQL statement(s) indicating how the intermediate table 145 records were selected from the tables of the business database 132. That is, the SQL statement indicates the selected business values 133 from the business database 132.

In another embodiment, the intermediate link 153 may be a summary link that additionally or alternatively includes analytical procedures (e.g., summation, averaging, maximum, minimum, etc.) that can be used to derive summary values corresponding to an analysis of the business values 133. As noted earlier, such a summary link may include SQL functions that perform analytical procedures on numeric values in the selected business values 133.

A next step is to select an intermediate link to identify the business values 133 (Block 216). Referring to FIG. 5A, illustrated there is an example intermediate link, shown generally as 153, that can be a summary link containing analytical procedures. The data in the intermediate link 153 may be provided by a database administrator through the use of the administration application 122 on the database administration terminal 102, and once specified, may be stored in the intermediate table 145 by collaboration module 128.

The intermediate link 153 may include an intermediate link Identifier field 530, a data connector field 532 and an accessor field 534. The intermediate link Identifier field 530 acts as a link to other programming modules referencing the intermediate table 145. In the example the intermediate link Identifier field 530 stores 'Region Sales' as the name of the intermediate table 145 to which it belongs. As will be discussed below, this name will be referenced by a KPI record 154 when defining a KPI.

In the example intermediate link 153, the data connector field 532 stores 'SalesDC' to indicate the method by which the intermediate table 145 is going to access business database 132. 'SalesDC' acts as a link to the data connector 152 discussed above (as shown in FIG. 4) that encapsulates the business database 132 access information. When accessing business database 132, the data connector record 152 with the data connector Identifier corresponding to 'SalesDC' is retrieved by the collaboration module 128 from the data connector database 142 and used to connect to business database 132. As discussed above, the data connector 152 information may include authentication data 408 such as a username and a password for allowing a connection to business database 132.

The accessor field 534 indicates how data in the intermediate table 145 corresponds to selected business values 133 in the business database 132. Specifically, it may dictate the intermediate values 155 (or in some cases, summary values) in the intermediate table 145, and how such values are derived from the selected business values 133. The selected business values 133 may be selected by the database administrator in an intelligible manner so as to assist the business analyst in deriving KPIs (discussed below). In the example, the indicated Structured Query Language (SQL) statement in accessor field 534 is executed on the selected business values 133 in the 'Orders' 133 and 'Regions' 133" tables (shown in FIGS. 3A and 3B respectively) described above after a connection to the business database 132 has been formed by using the information in data connector record 152. It will be understood by those skilled in the art that the SQL statement defines an inner join relationship between the two selected tables on the Region Identifier column which they have in common. The SQL statement also specifies that the resultant records are to be grouped by the Region ID column, and that an aggregation function is then to be applied to the OrderAmt column using the SUM function. Because of the presence of the SUM and COUNT analytical procedures referenced in the summary link, summary values corresponding to an analysis of the selected business values 133 will be produced. That is, the SQL query will result in the calculation of a single Order-Amt value for each set of grouped order records 310. A new counter column, Number of Orders, is also added which contains the number of orders for each region.

In some embodiments, the accessor field 534 may not store the SQL statement explicitly. That is, the administration application 122 may be configured to dynamically generate the SQL statement from stored selections of a visual query definition user interface (not shown) provided in the administration application 122.

In some embodiments, the intermediate data 153, 155 may include a plurality of intermediate values 155 and a corresponding intermediate link 153 for each intermediate value 155. Such a scenario may happen if multiple intermediate links 153 are used to generate a plurality of intermediate values 155; i.e., with each intermediate link 153 containing a different SQL statement to link to the business data values 133 in business database 132. This embodiment may be advantageous when, for example, there are multiple business databases 132 and database administrators may need to retrieve the business values 133 in several different ways.

Having selected the intermediate link 153, the intermediate values corresponding to business values 133 for the intermediate table 145 can be retrieved (Block 218). Referring to FIG. 5B, illustrated there is a preview of an intermediate table 145 containing the intermediate values, shown generally as 155, that would result from executing the SQL statement referenced in the intermediate link 153 discussed above, on the data shown in FIGS. 3A and 3B. As noted above, the example shown in FIG. 5B illustrates summary values. Each record 540 in the example preview of the intermediate table 145 may include four fields: a region Identifier 506 linking the intermediate values 155 to the different regions indicated in the 'Regions' table of FIG. 3B; the name for the region 524 as indicated in FIG. 3B, with the name of the field being renamed to 'Region Name'; a Total Sales field 504 for storing the summation of the sales amount for a given region; and a Number of Orders field 502 for storing the number of orders for a given region. As discussed, because the summary link included analytical procedures for producing summary values, the Total Sales and the Number of Orders columns may be calculated by executing the SQL statement provided in the accessor field 534 indicated in the summary link 153 as shown in FIG. 5A. As will be understood, different implementations for other applications may store additional and/or other types of data in the intermediate table 145.

For example, examining record 540a for the total sales for the Northeast region with Region Identifier 506 'R1', it can be seen that the number of orders field 502 indicates there have been two orders and that the amount of these two sales totals '790.00'. Referring back to FIG. 3A, the two orders indicated are the order records 310a, 310a' with Order Identifiers 302 '10003' and '10007'. It can also be seen that the sum of '790.00' can be derived from the figures in the order amounts 304 for those two records 310a, 310a' ('285.00'+'505.00').

Once the intermediate table 145 has been completed with the selection of the intermediate links 153 and the retrieval and determination of the intermediate values 155 corresponding to the selected business values 133, the intermediate table 145 may be used by business analysts to define a key performance indicator relevant for the construction company in the example. The business analyst need not know about the origins of the data stored in intermediate table 145, and may simply access and manipulate the intermediate values 155 or summary values that are present in the intermediate table 145 to form a KPI.

Such abstraction may be advantageous, if, for example, the layout of the underlying business database 132 changes. In such case, only the intermediate link 153 or the data connector 152 needs to be altered to produce an intermediate table 145 in the same format, and the KPI definition need not be altered.

Defining the Key Performance Indicators (KPI)

Referring back to FIG. 2, the intermediate table 145 may then be used in the process of defining a KPI record 154 (Block 220). As discussed earlier, a KPI is a metric that measures some aspect of business performance, and can be formed from the data present in the intermediate table 145. KPIs may be defined by business analysts using analyst terminal 104 such that when defining a KPI, the summary application 124 may be operable to generate a KPI record 154. The collaboration module 128 may store the KPI record 154 in KPI database 144. The KPI record 154 stores the type of data that is to be visualized, and defines how the visualization may be configured.

Illustrated in FIG. 6A is an example KPI record 154 derived from the intermediate table 145 in FIG. 5B, shown generally as 154. A KPI record 154 may have a KPI record Identifier field 602, an Intermediate Table field 653, a Metric field 655, a Dimension field 606, and a Format field 608. The KPI record Identifier field 602 provides an identifier for the KPI record 154 so that it may be referenced by a user and/or other programmatic modules.

To define a KPI record 154, a KPI link corresponding to the intermediate link 153 can be selected (Block 222). The KPI link corresponding to the intermediate link 153 may be stored in the Intermediate Table field 653 so as to provide a link to the Intermediate Table 145 supplying the data for the KPI. In the example illustrated, this Intermediate Table is the 'Region Sales' intermediate table 145 illustrated and discussed in relation to FIGS. 5A and 5B.

In some embodiments, the key performance indicator record 154 may include a plurality of key performance indicator values 655 and a corresponding key performance link 653 for each key performance indicator value 655. Such a scenario may arise if multiple KPI values 655 are defined from multiple intermediate tables 145. However, it should also be understood (and as will be explained later) that multiple KPI values 655 can be derived from the same KPI link 653.

A KPI value 655 corresponding to the intermediate value 155 can also be selected for the KPI record 154 (Block 224). In the example, the Metric field 655 stores a link to the aggregate 'Total Sales' field 504 of FIG. 5B reflecting the total sales in a given region for the construction company. The Metric field 655 generally references a data field in the intermediate table 145 that is of particular importance for the KPI, and can be selected from the intermediate values 155 generated for the intermediate table 145. Similarly, the Dimension field 606 indicates that it is the Region Name field 524 of the intermediate table 145 that the Total Sales field 504 will be plotted against. The Dimension field 606 is a field associated with the visual presentation of data, and may be specific to the bar chart graphical format.

Next, a KPI format for the KPI values may be selected (Block 226). The Format field 608 indicates that, in the example illustrated, the graphical format for depicting the KPI when it is rendered should be a 'Bar Chart'.

It will be understood that for other KPI records 154 with other visualization formats 608, there may be more or less KPI record 154 fields depending on the nature of the visualization format 608. For example, if a KPI is defined to be a percentage change for sales in a region between the same quarter in a current year and a previous year, and such figure is to be viewed as simply a text box, the KPI record 154 may not need to store the Dimension field 606 to show how to plot two-dimensional data. In some embodiments, the KPI fields may be independent of the KPI visualization format 608. In such case, if a visualization format 608 does not require a particular field (e.g., Dimension field 606), the field 606 may be ignored when the KPI is rendered.

Referring to FIG. 6B, illustrated there is a preview of the KPI data that would result after applying the properties of the KPI record 154 in FIG. 6A to the intermediate values 155 in the intermediate table 145 shown in FIG. 5B, shown generally as 650. Since the KPI has been defined as showing the amount of sales per region, the resulting data has two fields: a Region Name field 624 and a Total Sales field 655'. Examining the KPI preview record 640a for the 'Northeast' region, it can be seen that the total sales '790.00' is indicated in the KPI preview record 640a.

Referring simultaneously to FIGS. 6B and 5B, it can be seen that the unused columns of the intermediate table 145 are not included in the KPI preview 650. However, the KPI preview 650 still maintains data that corresponds to an intermediate value 155 in the intermediate table 145 because the KPI value 655 and the KPI link 653 (as shown in FIG. 6A) in the KPI record 154 were selected as corresponding to the intermediate table 145's intermediate values 155 and intermediate links 153.

It should be noted that KPI preview records 640, i.e., the data from executing the KPI records 154 may be dynamically generated (i.e., the data is immediately retrieved) when a graphical element 156 corresponding to the KPI is displayed on viewer application 186 on viewer terminal 180 (as shown in FIG. 1). In such embodiment, the KPI data is not stored in a database so as not to provide stale data when displaying the dashboard 190. Instead, data is dynamically generated, and the dashboard 190 shows an up-to-date snapshot of the business data values 133 stored in business database 132. Nevertheless, the storage of KPI preview records 640 (e.g., in KPI database 144) for static analysis of business values 133 on business database 132 is also within the contemplation of the subject embodiments.

Designing the Dashboard Using the KPI

Once a KPI record 154 is defined, the placement of graphical elements 156 corresponding to the KPIs on a dashboard 190 may be specified by a graphic designer (Block 228). A graphic designer may interact with designer terminal 106 and use drawing application 126 (as shown in FIG. 1) to organize the visual appearance of the KPI on the dashboard 190. For example, the graphic designer may specify the size and position of each graphical element 156 corresponding to the KPI, and he may also specify the color scheme or font used on the graphical element 156. These details may be stored in a graphical elements database 146 (also shown in FIG. 1). Each graphical element 156 may store further data (not shown) relating to the details of the visual appearance of the KPI, as well as a link (e.g., the KPI record Identifier 602 field shown in FIG. 6A) to the KPI record 154 for the KPI that the graphical element 156 corresponds to. In some embodiments, a graphical element can be configured to display more than one KPI. For example, this may be the case if the graphical element is a stacked bar chart.

After the graphical elements 156 have been laid out, the drawing application 126 may be configured to instruct the collaboration module 128 to retrieve the graphical element 156 from the graphical elements database 146 for rendering the KPI (Block 230). This may be viewed by a business executive using viewer application 186 on viewer terminal 180. Referring to FIG. 7, illustrated in the screenshot, shown generally as 700, of the completed dashboard 190 is a depiction of the 'Sales by Region' KPI (discussed earlier with regards to FIGS. 6A and 6B), referred to generally as 156'a. The screenshot may be displayed by viewer application 186 on viewer terminal 180 (as shown in FIG. 1) when the collaboration module 128 communicates the key performance indicator values 655 and the key performance indicator format 608 (as shown in FIG. 6A) to the viewer application 186 configured to render the key performance indicator preview records 640 (as shown in FIG. 6B) in the key performance indicator format 608. As can be seen, the data records 640 from the KPI preview 650 shown in FIG. 6B has been plotted in a bar chart form. The graphical element 156'a corresponding to the KPI record 154 in FIG. 6A shows the region name 624 plotted on the X-axis, and the total sales 655' for each of those regions plotted on the y-axis.

This visual representation of the business values 133 stored in the business database 132 may be used by a potential business executive of the construction company to quickly determine which region has been generating the most sales. For example, using this visualization, the business executive may be able to easily see that the sales in the 'Northwest' region are close to 3 times that of the 'Northeast' region.

While the formation of a dashboard 190 has been illustrated using the general steps above, the advantage of dividing the overall dashboard creation process into the described steps will further be illustrated in the context of a revision to the KPI record 154.

Revising the KPI Record 154

From the perspective of a business analyst, the presence of an intermediate table 145 having intermediate values 155 may be particularly advantageous when revising a KPI record 154. In one embodiment, the summary application 124 on analyst terminal 104 may contain a graphical user interface that shows intermediate values 155 of the intermediate table 145 (e.g., as shown in FIG. 5B) in a way that is easy to manipulate and access. Such user interface (not shown) may allow a business analyst to drag and drop the intermediate values 155 onto or away from a KPI record 154 to modify it.

Continuing on with the example of the construction company described above, a business analyst may now want to change the KPI record 154 indicating total sales by region (as shown in FIG. 6A) to a KPI record 154 showing the number of orders by region. This may be done, for example, because the latter KPI is perceived to be a better indicator of a region's business performance.

To do so, the business analyst may define another KPI record 154' (as shown in FIG. 8A). Referring again to FIG. 1, the intermediate data 153, 155 for the revised KPI may include a second intermediate value 155 corresponding to a second set of selected business values 133, and a second intermediate link 153 identifying the corresponding second set of selected business values 133.

In the example, the KPI record 154 in FIG. 6A may be revised to reflect the new type of data that is desired to be visualized. Referring again to FIG. 1, the business analyst may use summary application 124 on analyst terminal 104 to make modifications to the KPI record 154, and then send messages to collaboration module 128 to store the modified KPI record 154 into the KPI database 144.

It will be appreciated that although the example intermediate values 155 shown in FIG. 5B illustrate only four data records, in other embodiments, the intermediate values 155 of the intermediate table 145 may contain hundreds of fields that correspond to thousands of business values 133 in a complex business database 132. In such scenario, the task of the business analyst in defining or modifying KPI records 154 may be greatly simplified because the business analyst may not have to refer to the granular detailed data values 133 that may be present in business database 132. Instead, they may be able to identify metrics from the intermediate table 145 to define the KPI record 154. This is particularly the case if summary values corresponding to an analysis of the business values 133 are employed; i.e., if the analytical procedures specified in the summary link has summarized and reduced the volume of business values 133 that needs to be reviewed by a business analyst.

Also, the use of summary application 124 on analyst terminal 104 may provide flexibility for the business analyst in defining a KPI record 154. For example, if summary values 155 in the intermediate table 145 may contain numerous and different metrics, the business analyst may be able to more easily revise KPI records 154 if their initial definitions turn out to not be as effective in meeting the business requirements of an organization.

To define a second, revised KPI record 154, only a subset of the total steps in defining a dashboard 190 need to be repeated. Referring again to FIG. 2, it will be seen that only blocks 222-226 need to be repeated.

Referring simultaneously also to FIGS. 8A and 6A, shown in FIG. 8A is another KPI record 154' stored in KPI database 144 that has been modified from the KPI record 154 illustrated in FIG. 6A. The KPI record Identifier field 802 has a new name, 'Orders by Region', indicating the new type of data that is to be visualized.

The selection of a new KPI link 853 corresponding to a second intermediate link 153 (Block 222) is a straightforward step because the intermediate table 145 does not change. This is because the revised KPI is to be defined from the same intermediate table 145 as was indicated in FIG. 6A, i.e., the data being the same as was illustrated in FIG. 5B. The intermediate table field 853 thus has not changed, and still indicates 'Region Sales' as the intermediate table 145. The ability to reuse the same intermediate table 145 in the definition of another KPI record 154 may be particularly advantageous because it saves the business analyst from re-involving the database administrators to gather the business values 133 from the business database 132. In doing so, it allows individuals without expertise in information technology to be able to perform the KPI development step in dashboard 190 creation (and/or modification). Particularly, the ability to reuse intermediate values 155 in intermediate table 145 improves the usefulness of a dashboard 190 because changes can be made in the creation of a dashboard 190 project at a later step in the development workflow to adapt to feedback from business executives without the need to re-involve a business organization's technical personnel.

Next, a business analyst using the analysis terminal 104 may select a new KPI value corresponding to the second intermediate value (Block 224). The Metric field 855 is changed to 'Number of Orders' to reflect the second intermediate value 155 that is to be measured. Particularly, the Number of Orders field 502 in the intermediate table 145 of FIG. 5B will now be used in the KPI. The Dimension field 806 remains the same because the desired KPI is also a two-dimensional KPI that can be analyzed by region.

Having selected the new KPI links 853 and KPI values 855, the new KPI Format 808 can now be selected (Block 226). The KPI Format field 808 has been changed to indicate that a 'pie chart' is now the preferred visualization format over the 'bar chart' to visualize the data.

Referring to FIG. 8B, illustrated there is a preview of the KPI data that would result after applying the properties of the KPI record 154' in FIG. 8A to data in the intermediate table 145 shown in FIG. 5B, shown generally as 850. Since the KPI has been defined as showing the number of orders per region, the resulting data has two fields: a Region Name field 824 and a Number of Orders field 855'. Examining the KPI preview record 840a for the 'Northeast' region, it can be seen that the two orders for that region (i.e., as seen in the intermediate table 145 in FIG. 5B) is indicated in the KPI preview record 840a.

Referring to FIG. 9, illustrated in the updated screenshot, shown generally as 900, of an updated dashboard 190' is the graphical element 156'b depicting the 'Orders by Region' KPI from FIGS. 8A and 8B. As with the screenshot depicted in FIG. 7, this screenshot 900 may be rendered by viewer application 186 on viewer terminal 180 (as shown in FIG. 1), with the collaboration module 128 being configured to store and retrieve graphical element 156 in graphical elements database 146 to facilitate such rendering. That is, the new key performance indicator value (i.e., the number of orders per Region) has been rendered in the new key performance indicator format (i.e., the pie chart) because the new key performance indicator value 855 and the new key performance indicator format 808 have been communicated to the viewer application 186 in viewer terminal 180. The graphical element 156'*b* corresponding to the KPI record 154' in FIG. 8A shows each slice of the pie 850 labeled with the region name 824, with the size of the slice corresponding to the number of orders 855' in each region. Notably, the other graphical elements 156", 156''' from FIG. 7 have not changed because there have not been any modifications to the KPIs corresponding to those respective graphical elements 156", 156'''.

It should be understood that in the typical case, a newly defined KPI record may not be automatically shown on existing dashboards. That is, in order to have the new KPI appear on an existing dashboard 190, the new KPI may need to be "added" to the existing dashboard 190 using drawing application 126 on designer terminal 106. However, in some embodiments, a new KPI may be configured to appear on existing dashboards 190 in a 'default' position.

For clarity, it should be noted that the intermediate link 153 may not always perform analysis on the business data 133 in business database 132 so as to produce summary values. That is, as discussed above, in some cases, the intermediate link 153 may be configured just to select business values 133 from business database 132 without performing any type of analysis on the selected business values 133. In such case, analysis (such as arithmetic operations, counting, etc.) on the selected business values 133 may be subsequently performed by a business analyst with reference to the intermediate values 155 on analyst terminal 104.

For example, referring to FIGS. 10A and 10B, there is shown an intermediate link 153' and intermediate values 155' of another example intermediate table 145. The intermediate link 153' in FIG. 10A (with the identifier 1030 "Region Sales Details") is similar to that which is defined in FIG. 5A, except in this example, the database query in the accessor field 1034 does not perform any analytical procedures on the records 310, 340 in the Orders 133' or Regions 133' tables in FIGS. 3A and 3B respectively (i.e., it does not use the SQL SUM or COUNT functions). The SQL statement in accessor field 1034 only joins the Orders and Regions tables together, and renames the 'Name' column 324 of the Regions table (in FIG. 3A) to the field name 1024 'Region Name', without performing any analysis such as use of the SUM or COUNT functions as in the summary link 153 and summary values 155 in FIGS. 5A and 5B respectively.

Such an intermediate link 153' would result in the intermediate values 155' illustrated in FIG. 10B. These intermediate values 155' illustrate the records 1040 having the region name 1024 appended to the order records 310 as a result of the INNER JOIN operation performed on the region identifier 1006.

In such example, a business analyst may have more flexibility in defining KPIs because they can select from a broader range of data. For example, the business analyst may specify a KPI for the number of orders in a region over an order amount 1004 threshold.

It will be understood that the described system 100 may be flexible to encompass both embodiments: the use of intermediate values 155' that merely collect data records corresponding to a selected plurality of business values 133 in business database 132; and, the use of summary values in the intermediate values 155 corresponding to an analysis of the selected business values 133 in the business database 132. In the latter case, the business values may be derived by at least one analytical procedure specified in an intermediate link 153 that is a summary link. In either embodiment, the resultant intermediate values 155 in the intermediate table 145 may be used by a business analyst to define a KPI record 154.

It will be understood by persons skilled in the art that variations are possible in variant implementations and embodiments of the described dashboard creation system 100. Such variations include, but are not limited to, variations in the connectivity amongst described components, the sequence of execution by the described components, the organization of described components, as well as the data structures and types of data stored.

The steps of a method in accordance with any of the embodiments described herein may be provided as executable software instructions stored on computer-readable media, which may include transmission-type media. Such steps may not be required to be performed in any particular order, whether or not such steps are described in claims or otherwise in numbered or lettered paragraphs.

The invention has been described with regard to a number of embodiments. However, it will be understood by persons skilled in the art that other variants and modifications may be made without departing from the scope of the invention as defined in the claims appended hereto.

The invention claimed is:

1. A dashboard creation system for generating dashboards displaying key performance indicator information, the dashboard creation system comprising:
 (a) a business database comprising a plurality of business values;
 (b) an intermediate table comprising intermediate data, wherein the intermediate data comprises:
  (i) an intermediate value corresponding to a selected plurality of the business values, wherein the intermediate value comprises a summary value corresponding to an analysis of the selected plurality of business values; and
  (ii) an intermediate link identifying the corresponding selected plurality of business values, wherein the intermediate link comprises a summary link identifying at least one analytical procedure for producing the summary value;
 (c) at least one key performance indicator record comprising:
  (i) a key performance indicator value corresponding to the intermediate value;
  (ii) a key performance indicator link corresponding to the intermediate link; and
  (iii) a key performance indicator format corresponding to a desired graphical format for depicting the key performance indicator value.

2. The dashboard creation system of claim 1, further configured to render the key performance indicator value in the key performance format.

3. The dashboard creation system of claim 1, further configured to communicate the key performance indicator value and the key performance format to a drawing application configured to render the key performance indicator value in the key performance format.

4. A drawing application comprising the system of claim 1.

5. The dashboard creation system of claim 1, wherein the intermediate data comprises a plurality of intermediate values and a corresponding intermediate link for each intermediate value.

6. The dashboard creation system of claim 1, wherein the key performance indicator record comprises a plurality of key performance indicator values and a corresponding key performance indicator link for each key performance indicator value.

7. The dashboard creation system of claim 1, wherein the intermediate value is determined using a database query.

8. The database creation system of claim 7, wherein the database query comprises a SQL query.

9. A method for generating dashboards displaying key performance indicator information, the method comprising:
   (a) providing business data corresponding to a plurality of business values;
   (b) creating an intermediate table comprising intermediate data, wherein the intermediate data comprises:
      (i) an intermediate value corresponding to a selected plurality of the business values, wherein the intermediate value comprises a summary value corresponding to an analysis of the selected plurality of business values; and
      (ii) an intermediate link identifying the corresponding selected plurality of business values, wherein the intermediate link comprises a summary link identifying at least one analytical procedure for producing the summary value;
   (c) creating a key performance indicator record comprising:
      (i) a key performance indicator value corresponding to the intermediate value;
      (ii) a key performance indicator link corresponding to the intermediate link; and
      (iii) a key performance indicator format corresponding to a desired graphical format for depicting the key performance indicator value.

10. The method of claim 9, further comprising rendering the key performance indicator value in the key performance format.

11. The method of claim 9, further comprising communicating the key performance indicator value and the key performance format to a drawing application configured to render the at least one key performance indicator value in the key performance format.

12. The method of claim 9, further comprising revising the key performance indicator record.

13. The method of claim 9, wherein the intermediate data comprises a second intermediate value corresponding to a second selected plurality of the business values and a second intermediate link identifying the corresponding second selected plurality of business values, and wherein revising the key performance indicator record comprises:
   (a) determining a new key performance indicator value corresponding to the second intermediate value;
   (b) determining a new key performance indicator link corresponding to the second intermediate link;
   (c) determining a new key performance format corresponding to a desired graphical format for depicting the new key performance indicator value; and
   (d) storing the new key performance indicator value, the new key performance indicator link and the new key performance format in the key performance indicator record.

14. The method of claim 13, further comprising rendering the new key performance indicator value in the new key performance format.

15. The method of claim 13, further comprising communicating the new key performance indicator value and the new key performance format to a drawing application configured to render the new key performance indicator value in the new key performance format.

16. The method of claim 9, wherein the intermediate value is determined using a database query.

17. The method of claim 16, wherein the database query comprises a SQL query.

* * * * *